(12) United States Patent
Pitcher et al.

(10) Patent No.: US 6,947,405 B2
(45) Date of Patent: Sep. 20, 2005

(54) CELLULAR SYSTEM WITH CYBERCELLS

(75) Inventors: Gary J. Pitcher, Forest, VA (US); Timothy E. Dailey, Forest, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 722 days.

(21) Appl. No.: 09/812,210

(22) Filed: Mar. 19, 2001

(65) Prior Publication Data

US 2002/0131387 A1 Sep. 19, 2002

(51) Int. Cl.[7] ............................................... H04Q 7/24
(52) U.S. Cl. ....................... 370/338; 370/342; 370/343; 370/349; 370/352
(58) Field of Search ................................ 370/310, 311, 370/312, 313, 314, 315, 316, 317, 318, 319, 320–350, 352, 357, 389, 401, 466; 455/550.1, 556.1, 426, 426.1, 432.1, 442, 443, 445, 455, 458; 709/217

(56) References Cited

U.S. PATENT DOCUMENTS

| | | | | |
|---|---|---|---|---|
| 5,694,379 A | * | 12/1997 | Aratani et al. | 369/13.55 |
| 5,966,662 A | | 10/1999 | Murto | |
| 6,006,093 A | | 12/1999 | Aalto et al. | |
| 6,359,880 B1 | * | 3/2002 | Curry et al. | 370/352 |
| 6,400,722 B1 | * | 6/2002 | Chuah et al. | 370/401 |
| 6,600,734 B1 | * | 7/2003 | Gernert et al. | 370/352 |
| 6,671,510 B1 | * | 12/2003 | Kelly et al. | 455/445 |
| 6,711,417 B1 | * | 3/2004 | Gorman et al. | 455/550.1 |
| 6,738,641 B1 | * | 5/2004 | Elsasser | 455/523 |
| 6,757,263 B1 | * | 6/2004 | Olds | 370/315 |
| 2001/0030950 A1 | * | 10/2001 | Chen et al. | 370/329 |
| 2001/0046859 A1 | * | 11/2001 | Kil | 455/426 |
| 2002/0018450 A1 | * | 2/2002 | McKenna et al. | 370/328 |
| 2002/0098842 A1 | * | 7/2002 | Antonio et al. | 455/442 |
| 2002/0147008 A1 | * | 10/2002 | Kallio | 455/426 |

FOREIGN PATENT DOCUMENTS

| | | |
|---|---|---|
| EP | 0766427 | 4/1997 |
| EP | 0933956 | 8/1999 |
| GB | 2349780 | 11/2000 |
| WO | WO 9933250 | 7/1999 |
| WO | WO 0069156 | 11/2000 |
| WO | WO 0069186 | 11/2000 |
| WO | WO 0113659 | 2/2001 |

\* cited by examiner

*Primary Examiner*—Phirin Sam
*Assistant Examiner*—Anthony Ton

(57) ABSTRACT

A local site communication system, including a broadband connection between the local site and an internet, a wireless local site network in the local site and communicating data between the broadband connection and the mobile terminal when the mobile terminal is located at the local site, and a cyber base station connected to the internet and communicating data between the broadband connection and a mobile switching center whereby the mobile terminal when located at the local site connects to a mobile switching center via the wireless local site network, the broadband connection, the internet and the cyber base station. A voice client converts data between wireless signals on the wireless local site network and internet protocol signals on the broadband connection, and the cyber base station mimics a radio base station to the mobile switching center. The communication system is included in a cellular system including a plurality of low power wireless local site networks located in cells and served by the cyber base station. The wireless local site networks include a low power transceiver for communicating with mobile terminals. Methods of handing off a mobile terminal between cells and cybercells, and of placing and receiving calls in cybercells are also described.

26 Claims, 9 Drawing Sheets

CELLULAR SYSTEM WITH CYBERCELLS

BACKGROUND OF THE INVENTION

1. Field of the Invention

The present invention is directed toward wireless communication systems, and particularly toward improved use of the limited supply of channels in such systems.

2. Description of the Related Art

Wireless communication systems are, of course, widely used throughout the world today. In a typical system, cellular telephone phone systems are used to permit communication to mobile terminals which may move in and between different cells covered by different radio base stations. Current cellular systems such as GSM, IS-95 (CDMA) and IS-136 (D-AMPS) provide coverage in homes in the same way they provide coverage when the mobile terminal is on the road (i.e., all calls in a cell, including cellular telephone calls while at home, use cellular traffic channels). However, there is a limited supply of available channels, which supply is burdened more and more as the number of cellular subscribers continues to grow. Cellular operators typically add capacity to meet the growing number of subscribers by adding more traffic channels, if available, or more cells if not. Adding cells when sufficient traffic channel frequencies are not available involves reducing the size of surrounding cells, and is very expensive to do, since each new cell not only requires land or space for the cell tower and equipment, but also data lines to connect the cell to the mobile switching center as well as the equipment and installation costs.

One solution which has been proposed is to use an extremely low power home base station to handle cellular calls on mobile terminal made at home. The home base station would provide control channels and traffic channels within the operator's frequency band, but the power output would be so low as to not interfere with the larger surrounding cells. When a mobile terminal roams into the coverage of the home base station (i.e., is at home), it would switch to the home base station control channel to receive all services via the home base station. However, while this proposed solution provides more capacity (by reducing the load on the cells by switching some calls to the home base station), it introduces other problems. For example, such home base stations are fairly complicated and are themselves relatively expensive. Also, though the air interface of some standards has been designed to support such home base stations, it is not clear how the home base stations would tie back into the mobile switching center, since connecting individual home base stations to the mobile switching center like radio base stations does not scale well, since the radio base station interface with the mobile switching center is designed for a small number of radio base stations each with a large number of traffic channels whereas this solution would generate a large number of home base stations each using only a small number of traffic channels. Further, while the home base stations of this solution could connect directly to the public switched telephone network (PTSN) somewhat like a cordless telephone, this solution provides revenue to the PTSN operator at the expense of the cellular system operator.

The present invention is directed toward overcoming one or more of the problems set forth above.

SUMMARY OF THE INVENTION

In one aspect of the present invention, a local site communication system is provided for wireless communication with a mobile terminal in a local site and cooperating with a public communication including a cellular communication network, including a broadband connection between the local site and an internet, a wireless local site network in the local site and communicating data between the broadband connection and the mobile terminal when the mobile terminal is located in the local site, and a cyber base station connected to the internet and communicating data between the broadband connection and a mobile switching center whereby the mobile terminal when located at the local site connects to the public communication system via the wireless local site network, the broadband connection, the internet and the cyber base station.

In one form, a voice client converts data between wireless signals on the wireless local site network and internet protocol signals on the broadband connection. In another form the control channel information for the cyber base station includes internet protocol addresses. In still another form, the cyber base station mimics a radio base station to the mobile switching center. Still other forms are described herein.

In another aspect of the present invention, a wireless communication system is provided including a plurality of cells each served by a radio base station via wireless signals, a plurality of low power wireless local site networks located in the cells, the wireless local site networks served by a cyber base station via an internet and including a low power transceiver for communicating with mobile terminals, and a mobile switching center controlling the cyber base station and the radio base stations. Other forms of this aspect of the invention are also described herein.

Still other aspects of the invention which are described herein include a method of handing off a mobile terminal between a cell which communicates via a high power wireless base station and a cell which communicates via a low power wireless local site network and the Internet, a method of placing a call via a mobile switching center to a mobile terminal registered in a location area having a plurality of cells and a cybercell, and a method of placing a call to a phone via a mobile switching center from a mobile terminal served by a cybercell. Other forms of these aspects of the invention are also described herein.

DETAILED DESCRIPTION OF THE INVENTION

Figures 1, 1A:
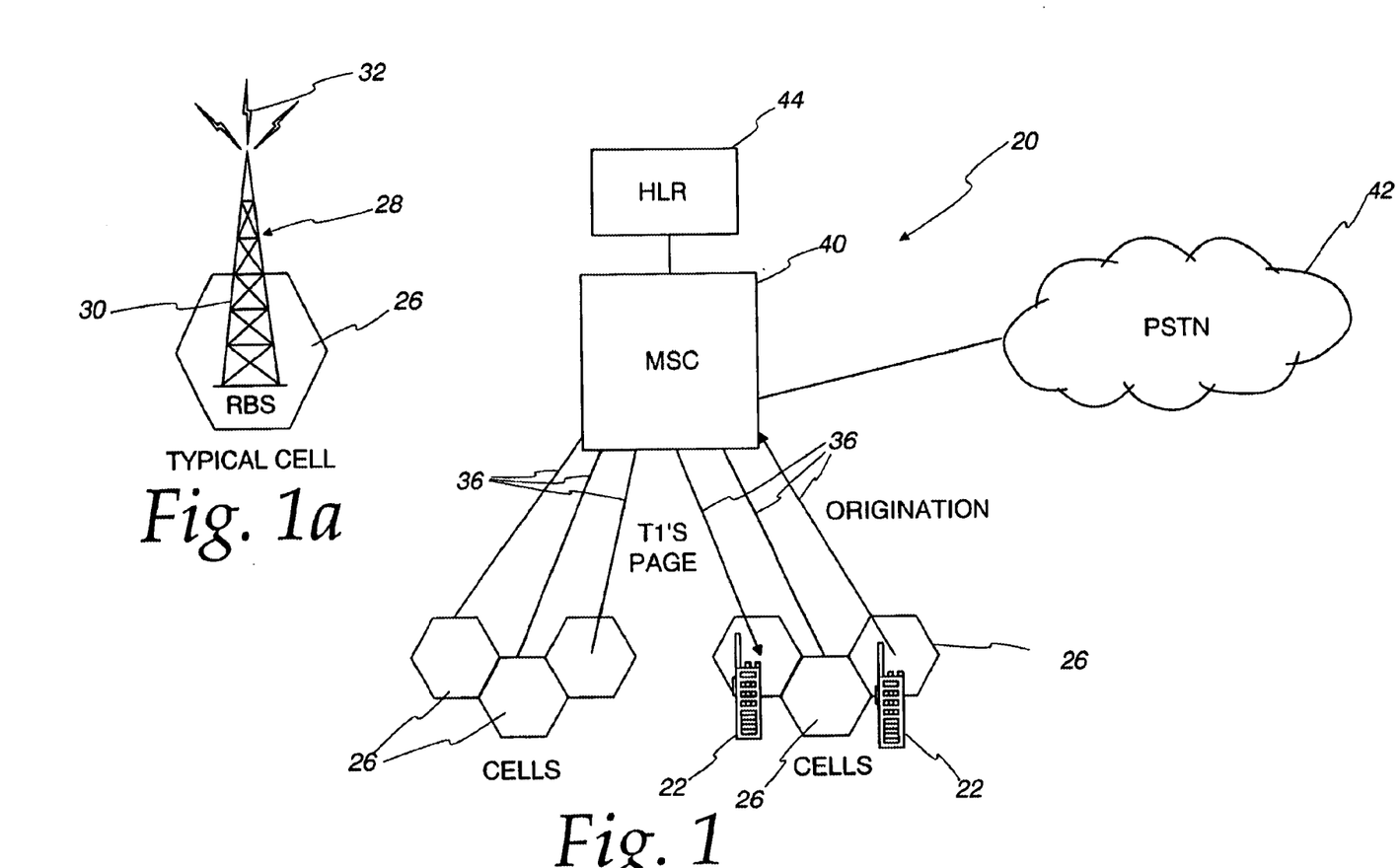
FIG. 1 is a diagram of a cellular system with which the present invention may be used.
FIG. 1a is a diagram of a typical cell of a cellular system such a shown in FIG. 1.

A typical cellular system 20 with which the present invention may be used is shown in FIG. 1. The cellular system 20 provides wireless communication for mobile terminals or mobile stations (MS) 22 such as cellular telephones. Such cellular systems 20 include multiple cells 26 each having a radio base station (RBS) 28 (see FIG. 1a) typically including a tower 30 and an antenna 32, where the radio base station 28 transmits/sends and receives communications with the mobile terminals 22 and has a basic intelligence to support low level protocol functions.

T1's or E1's 36 are typically used to connect the cells 26 with a mobile switching center (MSC) 40 which provides voice path switching between two cells 26 or a cell and the Public Switched Telephone Network (PSTN) 42. The mobile switching center 40 provides the central intelligence to control all the radio base stations 28 and process the high level protocol messages from mobile terminals 22 which are relayed by the radio base stations 28. The mobile switching center 40 handles call setup, paging, handoff and call connection (i.e., switching). While the mobile switching center 40 may involve multiple subsystems, for convenience herein all the related subsystems are referred to generically as the mobile switching center.

A home location register (HLR) 44 keeps track of the current status (i.e., on, off or busy) for each mobile terminal 22 and the location area (LA) of the mobile terminal 22 (the location area is a group of cells 26; a mobile terminal only registers its location when entering a new location area rather than every time is changes cells, which reduces control channel [CCH] traffic but also requires a paging process discussed hereafter). The home location register 44 also contains a database of mobile terminal restrictions and allowed features. For convenience, the home location register 44 will be assumed to be a part of the mobile switching center 40 herein unless otherwise noted.

Figure 2:
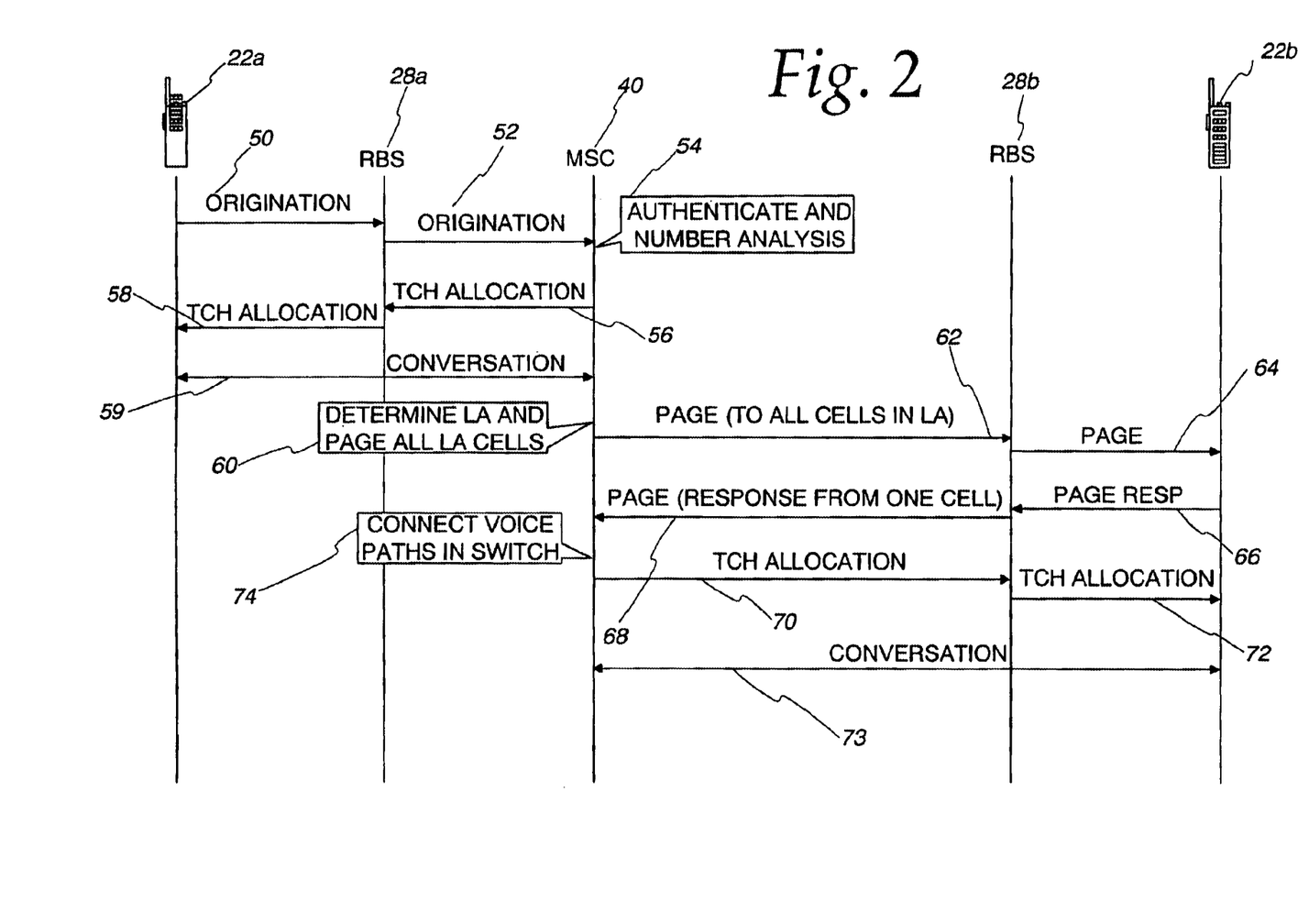
FIG. 2 is a flow chart illustrating a call between two mobile terminals.

A typical call from one mobile terminal 22a to another mobile terminal 22b in the above described cellular system 20 is illustrated in FIG. 2. The call begins with the one (originating) mobile terminal 22a issuing an origination message 50 which is received by the radio base station 28a, which checks the message for errors and, if all is correct, forwards the message or its equivalent 52 to the mobile switching center 40. The mobile switching center 40 authenticates 54 the originating mobile terminal 22a and analyzes the called number. If the originating mobile terminal 22a and the called mobile terminal 22b are valid, the mobile switching center 40 instructs 56 the serving radio base station 28a to assign a traffic channel (TCH) to the originating mobile terminal 22a, and traffic channel communication is established at 58 as is a voice path 59.

Since the called party in this typical mobile terminal-mobile terminal call is a mobile terminal 22b, the mobile switching center 40 checks the home location register 44 to determine 60 the current location area of the called mobile terminal 22b (if the called mobile terminal 22b is active). The mobile switching center 40 then issues a page message 62 to all radio base stations 28 in the location area of the called mobile terminal 22b, and the radio base stations 28 issue the page message 64 at an appropriate time (since the mobile terminal 22b only looks for pages at certain times, which times for each mobile terminal 22b are known to the radio base station 28, which permits the mobile terminal 22b to "sleep" the rest of the time and conserve battery power). This page message is issued to determine the radio base station 28b which currently services the mobile terminal 22b being called so that the mobile switching center 40 can set up a voice path to the appropriate radio base station 28b. The page message also wakes up the mobile terminal 22b from its battery saving mode.

When the called mobile terminal 22b recognizes the paging message, it issues a page response message 66, which the radio base station 28b serving the called mobile terminal 22b forwards 68 to the mobile switching center 40. The mobile switching center 40 then instructs 70 the radio base station 28b serving the called mobile terminal 22b to assign a traffic channel to the called mobile terminal 22b, and traffic channel communication is established at 72 as is a voice path 73. Finally, the mobile switching center 40 connects 74 the voice paths 59, 73 so that the call may proceed.

Figure 3:
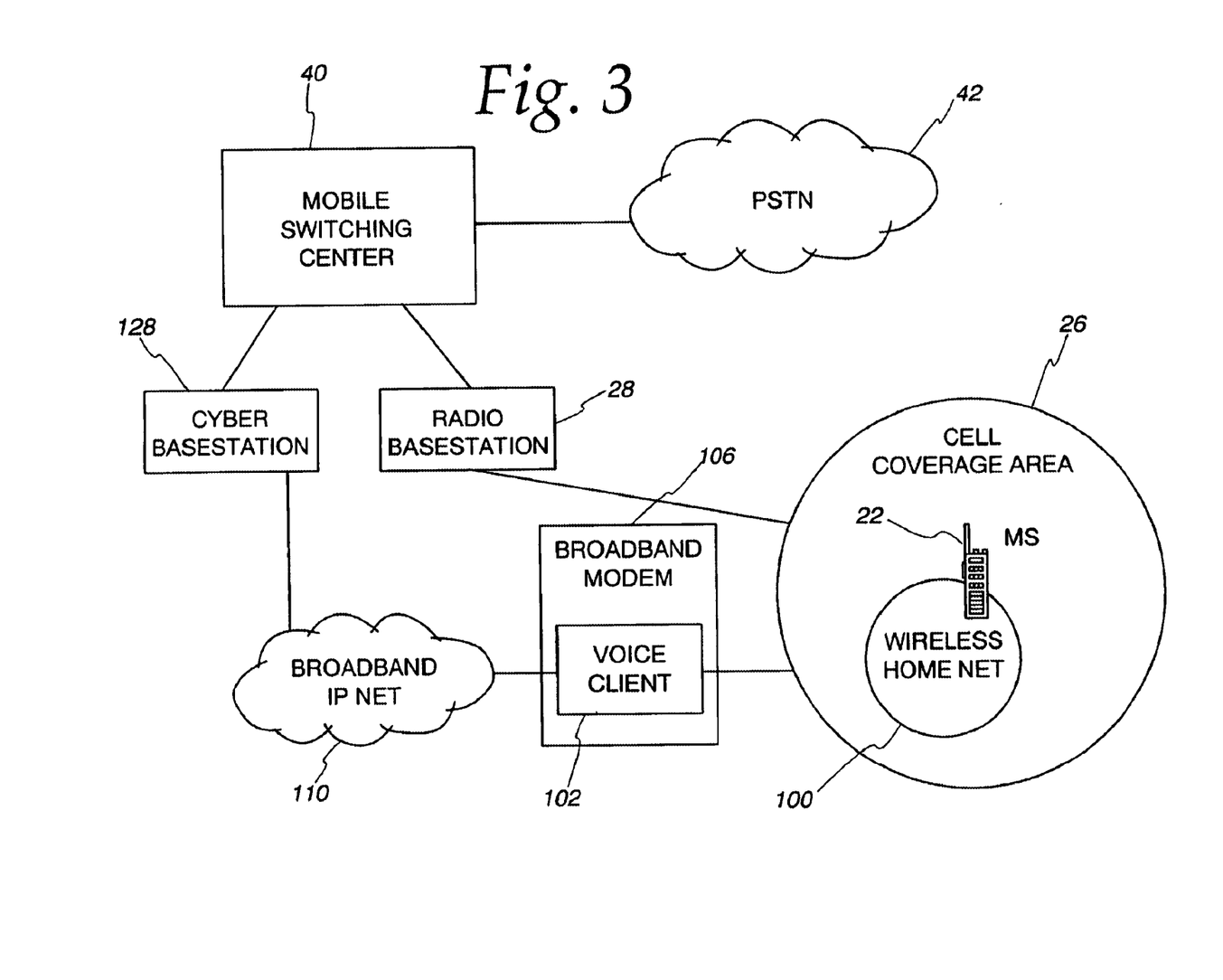
FIG. 3 is a diagram of a part of a cellular system incorporating the present invention.

In accordance with the present invention, a wireless home network 100, such as a Bluetooth, is located in a coverage area of a cell 26 (such as in the home of a mobile terminal user) as shown in FIG. 3. It should be understood that while reference is made herein to a "wireless home network", this is not intended to be limited to a wireless network which is in a "home", that is, an individual's personal dwelling. Rather, "home" is used for convenience to refer to a local site with which a mobile terminal 22 is associated. Therefore, the wireless home network 100 is also interchangeably referred to herein as a wireless local site network.

The wireless home network 100 provides wireless communication between a mobile terminal 22 located at the home (i.e., the coverage area of the wireless home network 100) and a voice client (VC) 102 embedded in a broadband connection 106 (such as cable, Asynchronous Digital Subscriber Line [ADSL] and Local Multipoint Distribution Service [LMDS] modems, which provide high speed, always-on connections to an internet) to a broadband Internet protocol network 110. (As used herein, "internet" [not capitalized] is used to refer not only to the Internet [public networks such as the World Wide Web], but also to private networks such as those sometimes referred to as intranets. It should be generally understood that the present invention could be used both with public and private networks.)

As described herein, the broadband internet protocol network 110 is the access network, such as cable or ADSL, and all the backbone networks which connect the cyber base station 128 to the voice client 102, where Cellular Messages are transported between the voice client 102 and the cyber base station 128 over the broadband internet protocol network 110. (As used herein, Cellular Messages refer to the higher layer protocol messages that normally pass between an mobile terminal 22 and radio base station 28 but which are passed over the wireless home network 100 and broadband internet protocol network 110 with the present invention. These Cellular Messages include control channel messages, call setup and tear-down messages, voice information and data. Depending on the cellular standard used, the messages may only include layer three or above or layer two or above [where layer two may be needed to provide addressing, error control and Slow Associated Control Channel (SACCH) information]). (It should be understood that while the disclosure herein may use terminology similar to those used by a specific cellular standard, it is not intended to limit the disclosure to such a standard and the invention may, in fact, be used with essentially any cellular standard.)

The mobile terminals 22 used with the present invention may be standard cellular telephones which also have an interface (such as Bluetooth) which may be used with the wireless home network 100. Such interfaces are, in fact, fast becoming standard already.

The voice client 102 functions to ensure that data is properly exchanged between the mobile terminal 22 and the cyber base station 128 and may be independent of cellular protocol (i.e., can be used on any cellular standard). The voice client 102 encapsulates messages between the mobile terminal 22 and cyber base station 128 in internet protocol packets and forwards those packets to the proper destination. The voice client 102 also sets up the appropriate QoS on the broadband internet protocol network 110.

A cyber base station (CBS) 128 is connected to the voice client 102 via the broadband internet protocol network 110, and is further connected to the mobile switching center 40 using a radio base station interface. The cyber base station 128 may mimic the operation of the radio base stations 28 so that the mobile switching center 40 does not know the difference between them (and therefore does not require significant changes to work with the cyber base station 128). As opposed to the control and traffic channels (CCH and TCH) used over standard cellular radio frequency interface, the cyber base station 128 provides internet control channels (ICCH) and internet traffic channels (ITCH) via the broadband internet protocol network 110.

An address server (AS) 130 is also provided to provide the voice client 102 with the internet protocol address of the cyber base station 128 with which the wireless home network 100 of the voice client 102 is associated. The address server 130 may map the wireless home networks 100 (the Cybercells as described below) to real cells 26 to prevent the mobile switching center 40 from being confused. The voice client 102 is provisioned with the address of the address server 130 so that the voice client 102 may direct information transmitted over the broadband internet protocol network 110 to the address server 130.

The voice client 102 manages the wireless home network 100 and passes messages between the mobile terminal 22 and the cyber base station 128. Such messages may be the higher level protocol messages such as sent between mobile terminals 22 and radio base stations 28 outside the wireless home network 100, and are transmitted over the low power wireless home network 100 and the wired broadband internet protocol network 110 rather than using control channels and/or traffic channels which might interfere and/or tie up the use of such channels in the standard cell 26 surrounding the home. The broadband internet protocol network 110 may be provisioned to provide the necessary QoS when requested.

For security and to ensure that unauthorized use of the wireless home network 100 is not made, the wireless home network 100 may support a pairing function where only selected mobile terminals 22 may be used with a particular wireless home network 100. Further, authorized mobile terminals 22 may establish an association with a voice client 102 of the wireless home network 100 with which they are authorized. Such association notifies the authorized mobile terminal 22 that the voice client 102 exists on the wireless home network 100 so that the mobile terminal 22 will communicate with the voice client 102 each time it enters the wireless home network 100.

Figure 4:
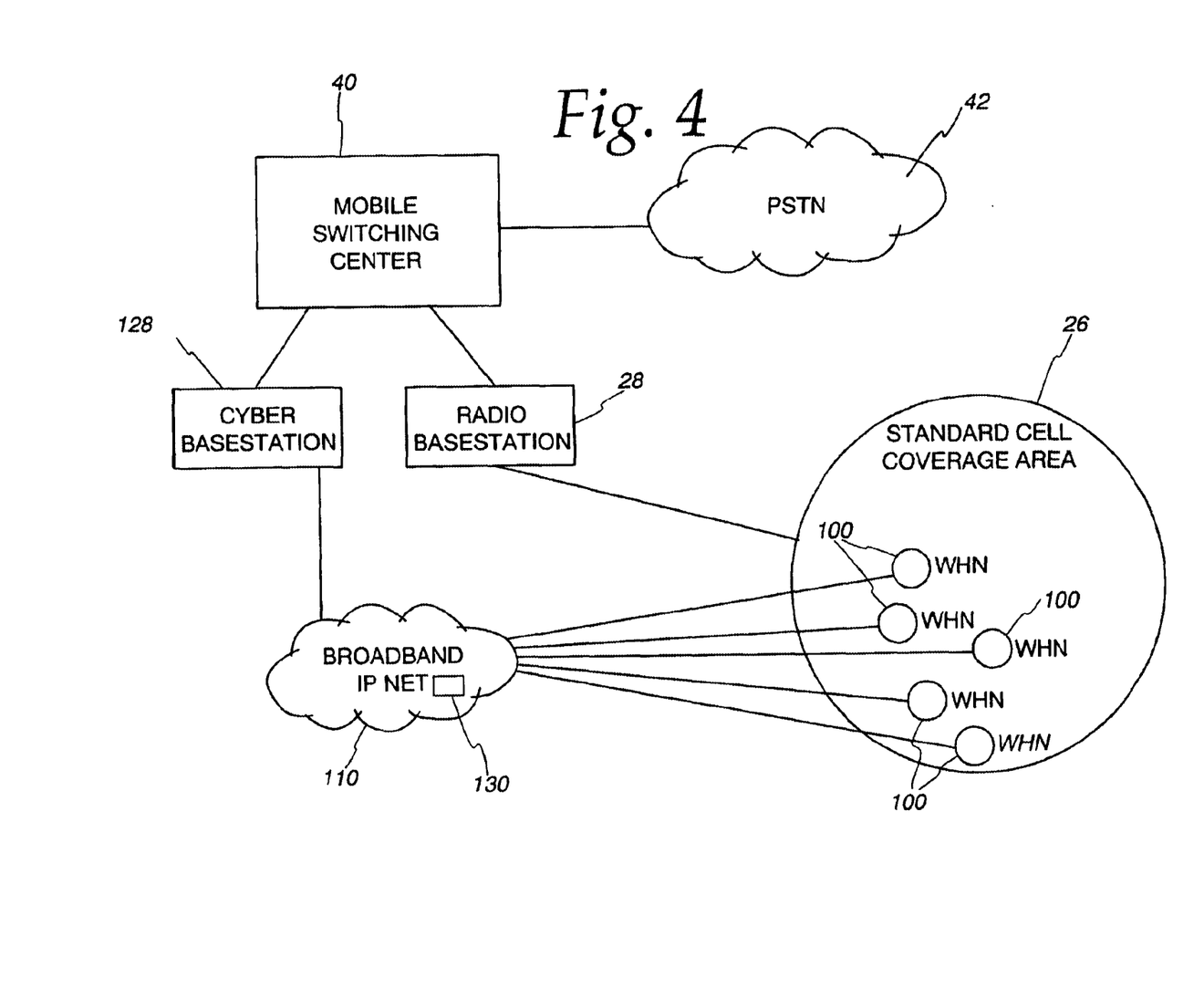
FIG. 4 is a diagram of a part of a cellular system having multiple wireless local site networks according to the present invention.

Though FIG. 3 shows the connection of one wireless home network 100 to the cyber base station 128, in accordance with the present invention the cyber base station 128 is connected via the broadband internet protocol network 110 to a plurality of wireless home networks 100 such as illustrated in FIG. 4. Thus, as opposed to the previously discussed home networks, the mobile switching center 40 will connect to a cyber base station 128 which appears much the same as radio base stations 28, the cyber base station 128 being only one (or relatively few) additional base station handling a large number of traffic channels. Thus, the cyber base station 128 may be easily incorporated into current cellular systems 20 without creating massive numbers of new and/or different connections which mobile switching centers 40 are not designed to handle.

The cyber base station 128 may be treated as a pico radio base station, which is a very low power radio base station used to create a small cell (radio base stations are available in different power levels to provide different size cells, with pico radio base stations typically used to create a small cell in a high density area, where such pico cells may be completely overlapped by a standard cell but the power and/or frequencies of the pico cell are selected to minimize interference with the standard cell).

The mobile switching center 40 may treat the cyber base station 128 as a regular radio base station 28, and therefore may assign the frequencies for the cyber base station 128 to use. The cyber base station 128 does not really need frequencies since it uses the broadband internet protocol network 110 rather than the cellular spectrum, but allowing such assignments allows the cyber base station 128 to be used with only minimal changes to the mobile switching center 40 and treating the cyber base station 128 as a pico radio base station creates a minimum impact on the mobile switching center's overall frequency plan. In effect, the cyber base station 128 and large number of wireless home networks 100 connected thereto appears to the mobile switching center 40 to be a single pico radio base station potentially serving multiple mobile terminals in its coverage area. The "cell" covered by the cyber base station 128 (i.e., the combined coverage areas of the homes having a wireless home network 100 and connected to the cyber base station 128) is a Cybercell.

A Cybercell may be included in the location area of the neighbor standard cells 26, to allow for a smooth transition (hand-off) between the Cybercell and the standard cells 26 and to eliminate the need for the mobile terminal 22 to register when entering or leaving the Cybercell (i.e., when leaving home). The cyber base station 128 may be added to the neighbor list of surrounding cells 26 without changing the mobile switching center code or configuration files. Also, the mobile terminal 22 and the cyber base station 128 may ignore most of the Physical Layout information in the Cellular Messages when the mobile terminal is home (i.e., is communicating through its wireless home network 100). Again, such operation (allowing normal data to be handled normally even though it is not used) makes retrofitting of the invention into existing cellular systems 20 easy, fast and relatively inexpensive. Mobile switching centers are very complex and require a long development cycle to create and test new features, and therefore allowing the introduction of new wireless home networks 100 without requiring modifications or disruptions to the core network is extremely advantageous.

As previously noted, a cyber base station 28 mimics a radio base station 28. Therefore, while a radio base station 28 transmits the forward control channel so that all mobile terminals in that cell 26 can listen for broadcast system information and individual commands, the cyber base station 128 may mimic the radio base station 28 by transmitting the internet control channel on an internet protocol multicast address (which is therefore relayed to the multiple wireless home networks 100 connected to the cyber base station 128). It should be understood, however, that while reference is had herein to multicast addresses, individual internet protocol addresses rather than multicast addresses could also be used within the scope of the present invention.

Mobile terminals which roam into a Cybercell will monitor the multicast internet protocol control channel with help from the voice client 102. Further, mobile terminals 22 transmit messages to the radio base station 28 on the reverse control channel which is more of a point-to-point link (since the mobile terminal messages are heard only by the radio base station 28), and the cyber base station 128 mimics the radio base station 28 by using individual internet protocol addresses (i.e., addresses which the cyber base station 128 recognizes to be from a particular voice client 102 and which are "heard" only by the cyber base station 128) for the reverse internet control channel.

It should be understood that the invention may operate for different call scenarios, including (1) the mobile terminal 22 roaming in and out of the wireless home network 100, (2) the mobile terminal 22 originating a call on the wireless home network 100, (3) the mobile terminal 22 receiving a call on the wireless home network 100, (4) handoff of a mobile terminal 22 from cellular (served by a radio base station 28) to a wireless home network 100, and (5) handoff of a mobile terminal 22 from a wireless home network 100 to cellular (served by a radio base station 28). Manners of operation for these scenarios are shown in FIGS. 5–9 and discussed below. It should be noted that the message flows described below are intended to be high level, and messages which are not significant to the invention may not be described below. Further, the sequence of messages indicated below is not intended to be exact, but are set forth simply to illustrate and explain the basic concepts of the present invention, and it should be understood that variations thereto would fall within the scope of the invention described herein.

(1) Mobile Terminal 22 Roams in and Out of the Wireless Home Network 100

In accordance with the present invention, when a mobile terminal 22 is camped on a cellular control channel in a location area, it periodically samples for the presence of a wireless home network 100 which it is authorized to use. Such sampling may be done periodically only to preserve battery life.

Figure 5:
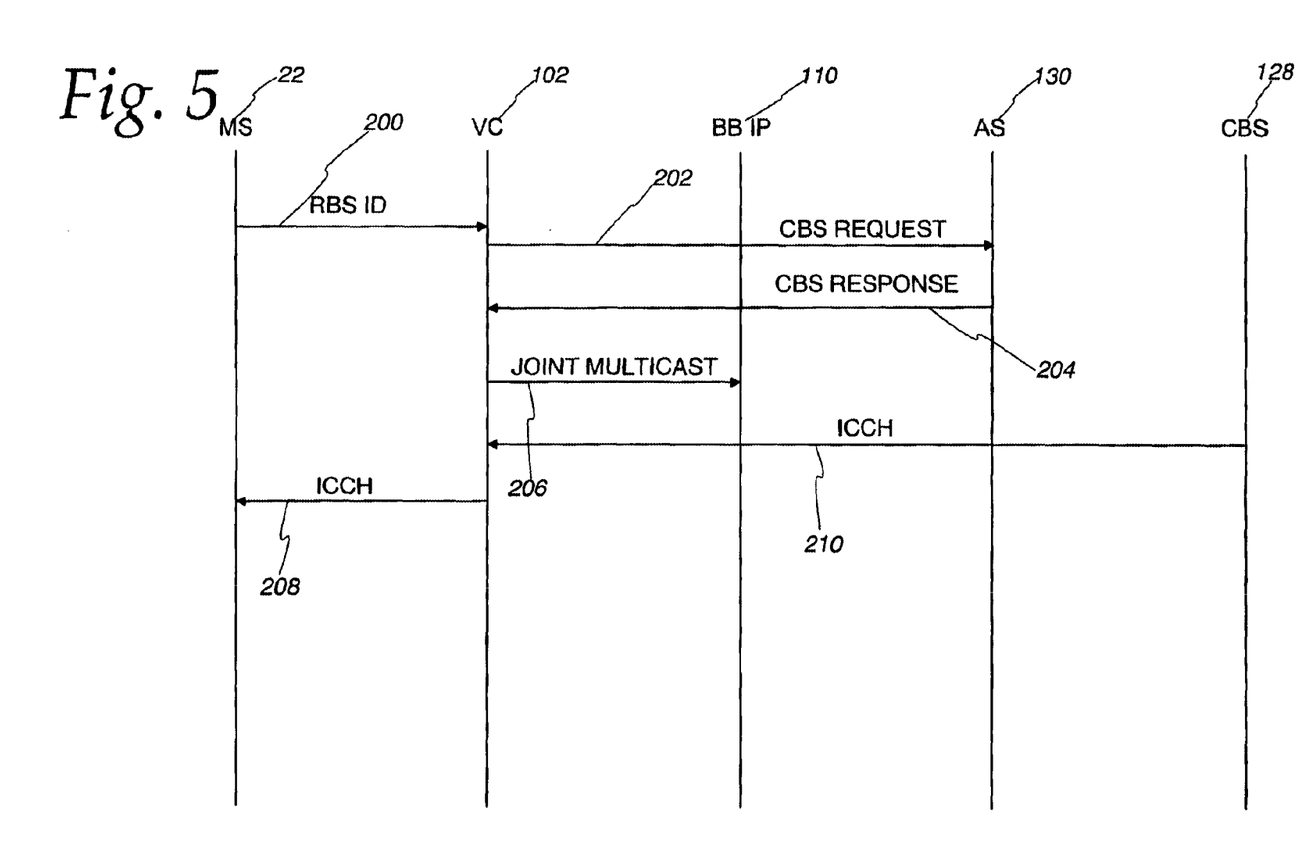
FIG. 5 is a flow chart illustrating a mobile terminal roaming into the wireless local site network.

When the mobile terminal 22 moves into the range of a wireless home network 100 and detects the presence of that wireless home network 100, it joins the wireless home network 100 by contacting the voice client 102 (e.g., using Bluetooth) and provides information 200 to the voice client 102 which uniquely identifies the current radio base station 28 in an RBS ID command as shown in FIG. 5. This information can vary depending upon the cellular standard being used.

The voice client 102 then provides the address server 130 with the base station identification information in a cyber base station request command (at 202), and the address server 130 responds at 204 with the cyber base station response which contains the multicast internet protocol address of the forward internet control channel and the individual internet protocol address of the reverse internet control channel. With this information, the voice client 102 joins (at 206) the internet control channel multicast group on the broadband internet protocol network 110 and forwards (at 208) the broadcast and individual internet control channel information received from the cyber base station 128 (at 210) to the mobile terminal 22. The voice client 102 may filter out any messages not intended for the mobile terminal 22 based on addressing and, since the mobile terminal 22 should adhere to the timing of the power conservation mode of the wireless home network 100 (which is different from the cellular air interface), the cyber base station 128 may mask timing discrepancies by buffering messages.

A sleep or park mode may be provided in the wireless home network 100, where data is received from the voice client 102 only periodically, to conserve battery life. The voice client 102 may buffer internet control channel data until the mobile terminal 22 "wakes up" from that mode, with the mobile terminal 22 acknowledging receipt of the data as part of the wireless home network 100 protocol (or a higher level acknowledgment may also be used), with the acknowledgment informing the voice client 102 that the mobile terminal 22 is still in the area and part of the wireless home network 100.

Part of the information included in the internet control channel from the cyber base station 128 is the neighbor cell list. The mobile terminal 22 uses this list to scan the neighbor control channels so that it can quickly roam to the strongest cellular control channel if the mobile terminal 22 leaves the wireless home network 100. When the mobile terminal 22 detects that the wireless home network 100 signal has degraded below the acceptable limit, it may simply camp on the strongest cellular control channel it had previously identified from its background scanning and then stop responding to the wireless home network 100. When the voice client 102 detects that the mobile terminal 22 is no longer a part of the wireless home network 100 as part of the wireless home network technology (e.g., it fails to receive expected acknowledgments from the mobile terminal 22), the voice client 102 leaves the multicast cyber base station 128 group until the mobile terminal 22 returns.

(2) Mobile Terminal 22a Originated Call on Wireless Home Network 100

Figure 6:
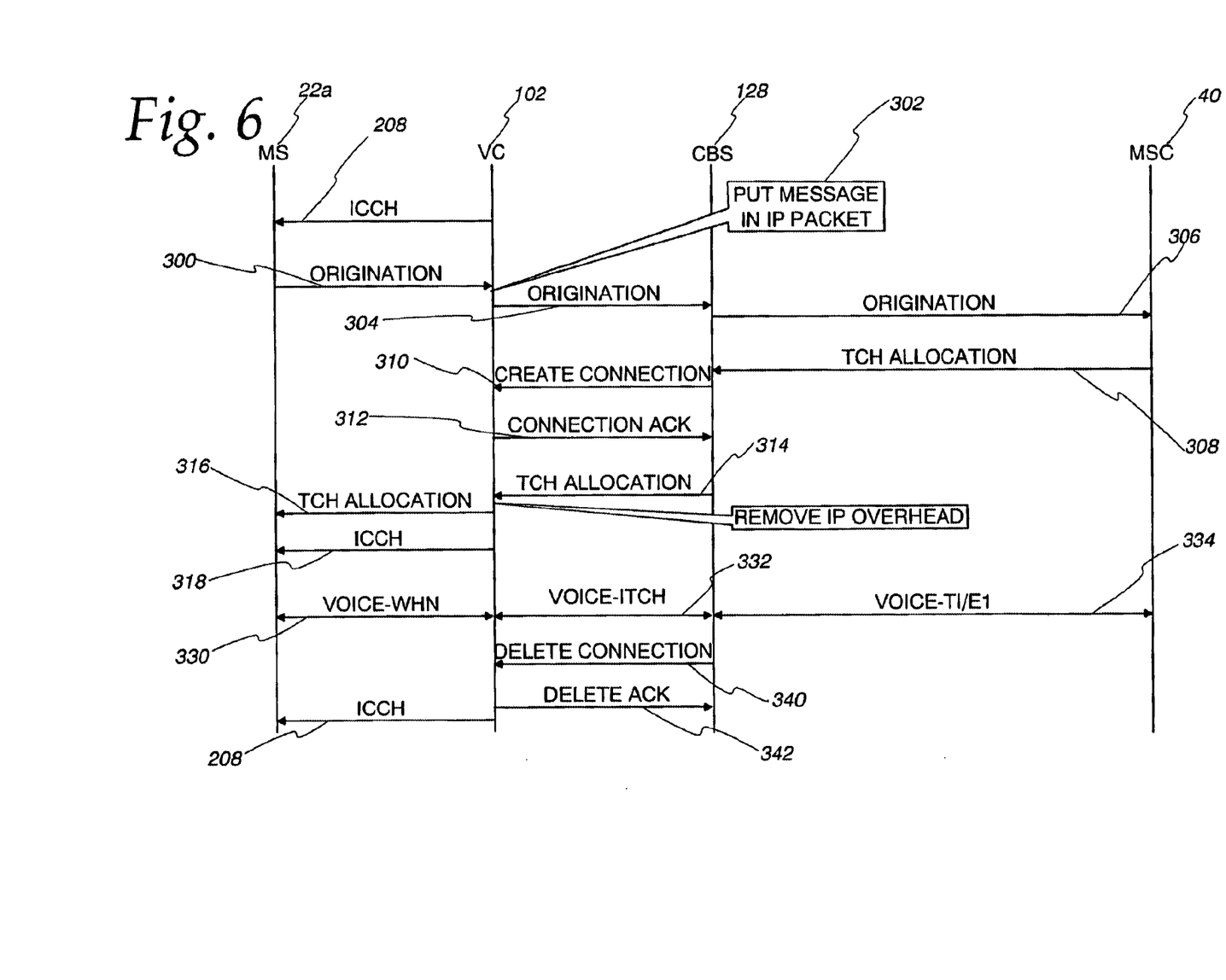
FIG. 6 is a flow chart of a mobile terminal originating a call on the wireless local site network.

When an authorized mobile terminal 22a is in a wireless home network 100 such as described above and wishes to originate a call (place a call) from the wireless home network 100, the mobile terminal 22a initially sends an Origination message (at 300) which includes the number to call. The voice client 102 encapsulates (at 302) the Origination message in an internet protocol packet and forwards (at 304) the message to the individual internet protocol address (at the cyber base station 128) of the reverse internet control channel (established as described in connection with FIG. 5). The cyber base station 128 then processes the message and sends (at 306) the appropriate request to the mobile switching center 40. The mobile switching center 40 accepts the call request and tells the cyber base station 128 to allocate a traffic channel with the traffic channel allocation command (at 308).

The cyber base station 128 then instructs (at 310) the voice client 102 to set up a connection for the traffic channel. This instruction may include connection information such as the internet protocol address and the port number the cyber base station 128 would like to use for the connection. It may also include information about the media stream that will be sent on the connection so that the voice client 102 can establish the proper QOS on the broadband internet protocol network 110. This setup can use any suitable protocol, including standard protocols such as Session Description Protocol and Session Initiation Protocol. The voice client 102 creates the connection with the broadband internet protocol network 110 with the appropriate QoS and then sends (at 312) an acknowledgment which informs the cyber base station 128 that the connection has been created. This acknowledgment may contain information about the voice client's side of the connection as well.

The cyber base station 128 then sends (at 314) the traffic channel assignment on the internet channel assignment which the voice client 102 forwards (at 316) to the mobile terminal 22*a*. The mobile terminal 22*a* does not move to the cellular traffic channel in this assignment, but instead stops listening to the internet control channel and begins listening to the internet traffic channel.

The voice client 102 then forwards (at 318) both the internet control channel and the internet traffic channel to the mobile terminal 22*a* which the mobile terminal 22*a* may then use when needed. This approach simplifies the mobile terminal 22*a* transitions between the internet control channel and the internet traffic channel.

When the call is connected to the called number, appropriate voice channels are established, for example, a wireless voice channel (at 330) between the mobile terminal 22*a* and the voice client 102, a voice channel (at 332) using the internet traffic channel between the voice client 102 and the cyber base station 128, and a voice channel (at 334) using the T1 or E1 connections between the cyber base station 128 and the mobile switching center 40. (The voice connection between the mobile switching center 40 and the called number, whether a mobile terminal or a fixed line telephone on a PSTN 42, is not shown but may be accomplished as is known).

When the call is terminated, the cyber base station 128 stops sending packets on the internet traffic channel and issues (at 340) a delete connection command to the voice client 102. The voice client 102 releases the QoS resources on the broadband internet protocol network 110 and acknowledges (at 342) the command to delete the connection. If the mobile terminal 22*a* remains in the home, the voice client 102 will continue to forward (at 208) the broadcast and individual internet control channel information received from the cyber base station 128 to the mobile terminal 22*a*, and the mobile terminal 22*a* will remain active on that wireless home network 100.

(3) Call Received by Mobile Terminal 22*b* on Wireless Home Network 100

Figure 7:
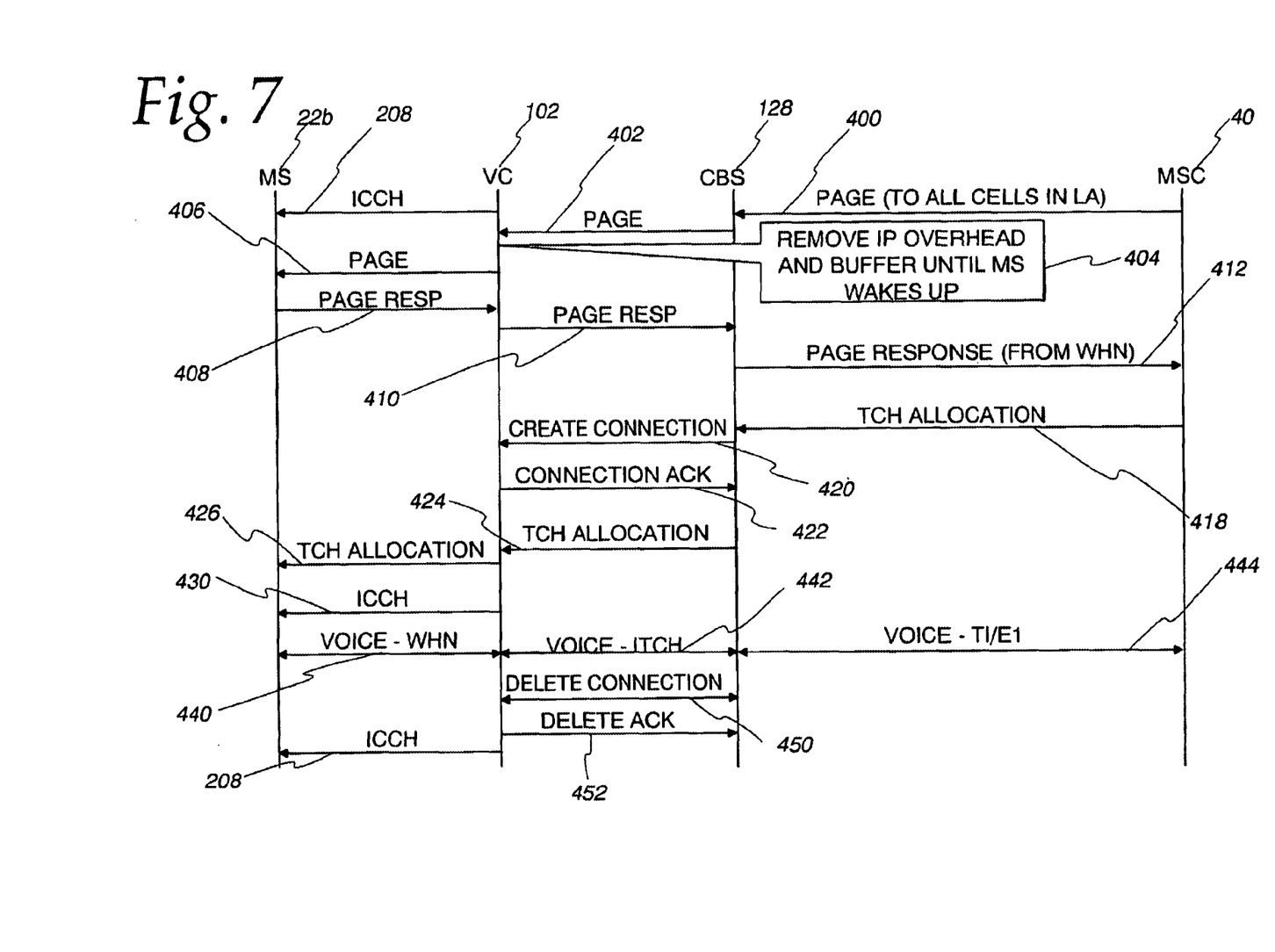
FIG. 7 is a flow chart of a mobile terminal receiving a call on the wireless local site network.

When an authorized mobile terminal 22*b* is in a wireless home network 100 such as described above and a call is placed to the number of the mobile terminal 22*b*, the mobile switching center 40 will first receive the incoming call. As shown in FIG. 7, since the mobile switching center 40 only tracks calls to a location area (i.e., a plurality of cells as noted above), the mobile switching center 40 will instruct (at 400) all base stations in the location area (radio base stations 28 and cyber base station 128, though only cyber base station 128 is shown in FIG. 7) to issue a page for the mobile terminal 22*b*. The cyber base station 128 (and other radio base station 28 in the location area) then issue (at 402) the page message.

The voice client 102 removes internet protocol overhead and buffers the page message at 404 until the mobile terminal 22*b* wakes up from its low power state, at which point the page message is forwarded (at 406) by the voice client 102 to the mobile terminal 22*b*. Buffering of the page message is not a problem and does not give rise to new procedures inasmuch as radio base stations 28 will also buffer page messages until the proper paging time on the cellular air interface.

The mobile terminal 22*b* then forwards (at 408) a Page Response to the voice client 102 to acknowledge that it received the page message. The voice client 102 forwards (at 410) the Page Response on the reverse internet control channel to the cyber base station 128, and the cyber base station 128 forwards (at 412) the Page Response to the mobile switching center 40.

At that point, the mobile switching center 40 knows which cyber base station 128/radio base station 28 covers the called mobile terminal 22*b*, and therefore the mobile switching center 40 thereafter only communicates with the covering cyber base station 128 for the remainder of this call. Specifically, the mobile switching center 40 sends (at 418) a traffic channel allocation to the cyber base station 128.

Upon receiving the traffic channel allocation, the cyber base station 128 and voice client 102 then proceed to create a connection with the mobile terminal 22*b* in much the same manner as described above in connection with FIG. 6 when creating a connection with a calling mobile terminal 22*a*. Specifically, the cyber base station 128 instructs (at 420) the voice client 102 to set up a connection for the traffic channel, and the voice client 102 creates the connection with the broadband internet protocol network 110 with the appropriate QoS and then sends (at 422) an acknowledgment which informs the cyber base station 128 that the connection has been created. The cyber base station 128 then sends (at 424) the traffic channel assignment on the internet channel assignment which the voice client 102 forwards (at 426) to the mobile terminal 22*b*. The mobile terminal 22*b* does not move to the cellular traffic channel in this assignment, but instead stops listening to the internet control channel and begins listening to the internet traffic channel. The voice client 102 then forwards (at 430) both the internet control channel and the internet traffic channel to the mobile terminal 22*b* which the mobile terminal 22*b* may then use when needed (as previously noted, this approach simplifies the mobile terminal 22 transitions between the internet control channel and the internet traffic channel). Appropriate voice channels are then established, for example, a wireless voice channel (at 440) between the mobile terminal 22*b* and the voice client 102, a voice channel (at 442) using the internet traffic channel between the voice client 102 and the cyber base station 128, and a voice channel (at 444) using the T1 or E1 connections between the cyber base station 128 and the mobile switching center 40. (The voice connection between the mobile switching center 40 and the calling telephone, whether a mobile terminal or a fixed line telephone on a PSTN 42, is not shown but may be accomplished as is known, including as shown in FIG. 6 if the calling telephone is a mobile terminal 22*a* in a wireless home network 100).

When the call is terminated, the cyber base station 128 stops sending packets on the internet traffic channel and issues (at 450) a delete connection command to the voice client 102. The voice client 102 releases the QoS resources on the broadband internet protocol network 110 and acknowledges (at 452) the command to delete the connection. If the mobile terminal 22*b* remains in the home, the voice client 102 will continue to forward (at 208) the broadcast and individual internet control channel information received from the cyber base station 128 to the mobile terminal 22*b*, and the mobile terminal 22*b* will remain active on that wireless home network 100.

(4) Mobile Terminal Handoff from Cellular to a Wireless Home Network 100

At times, a mobile terminal 22 may be in the middle of a call when it leaves one system and enters another. In that case, the mobile terminal 22 should be handed-off from the previous system to the new one without losing the ongoing call.

Figure 8:
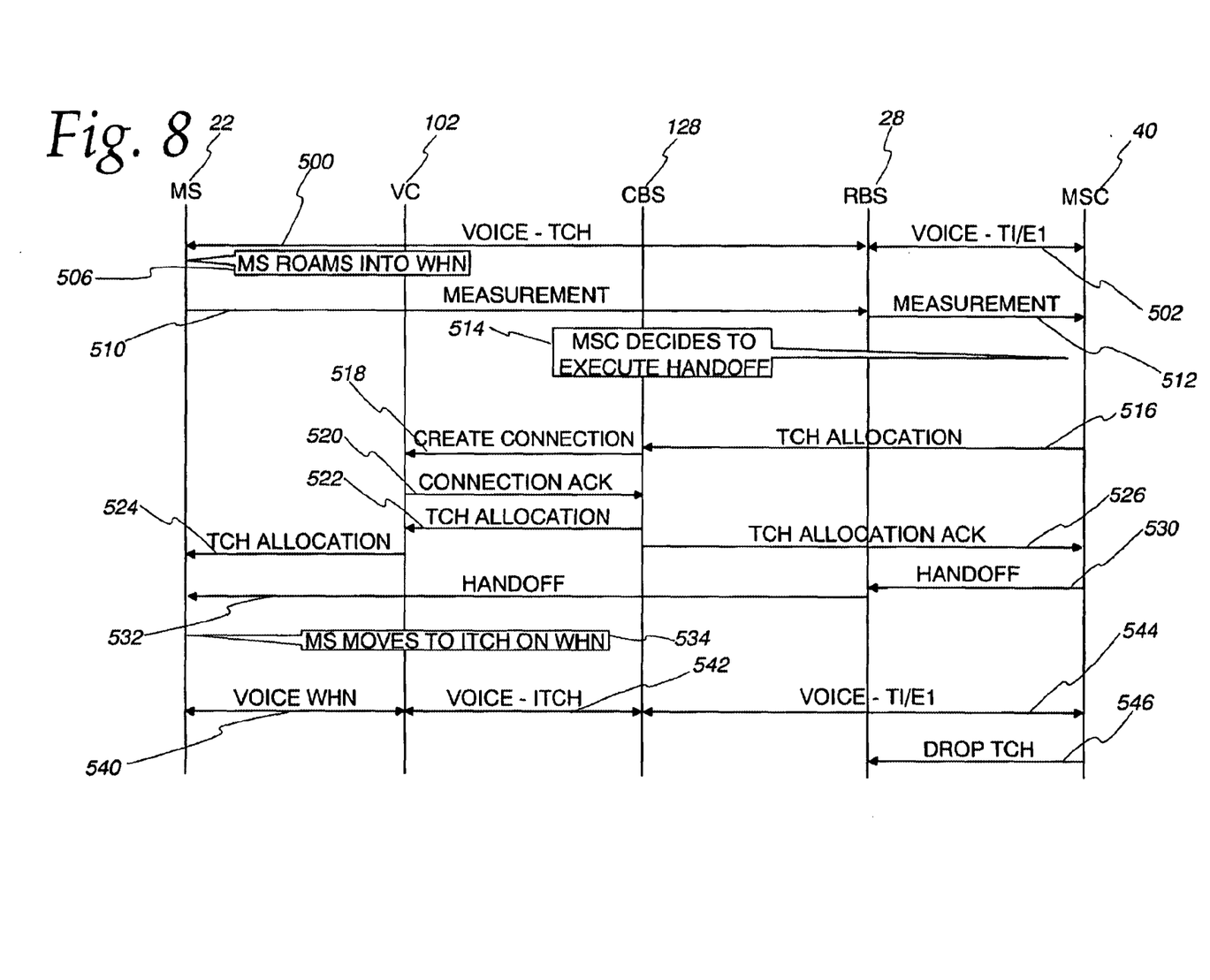
FIG. 8 is a flow chart of a handoff of a mobile terminal from cellular to the wireless local site network.

Specifically, while a call is ongoing, the mobile terminal 22 monitors the power level and/or Bit Error Rate (BER) of the current traffic channel and control channel of neighbor cells. The mobile switching center 40 provides a list of control channels to measure via the radio base station 28, and the active (current) radio base station 28 also measures the power level and Bit Error Rates of mobile terminal transmissions on the traffic channel. All of these power measurements are fed back to the mobile switching center 40 which decides when a handoff is necessary. The mobile switching center 40 may initiate a handoff because the current radio base station signal is too weak, because a preferred radio base station's signal is acceptable, or to balance traffic loads between calls.

Since, as mentioned earlier, the mobile switching center 40 may include the cyber base station control channel in the neighbor list of the surrounding cells but the cyber base station 128 does not transmit on cellular frequencies, mobile terminals 22 will not find a signal on that frequency. Therefore, the mobile terminal 22 should know to look for the wireless home network 100 on the frequencies of the wireless home network 100 and report scaled values of the wireless home network 100 in place of the cyber base station control channel measurements. Scaled values are used because the power measurements of the low power wireless home network 100 may be very different from those measured on the cellular system. By scaling, the strongest wireless home network 100 reading is reported as the strongest cellular reading (even though it may not be as strong as the strongest reading from a radio base station 28) and the weakest wireless home network 100 reading reported as the weakest cellular reading, with intermediate values interpolated accordingly.

Also, the cyber base station 128 may report measurements of the mobile terminal transmissions, like a radio base station 28. However, unlike a radio base station 28, the cyber base station 128 does not receive direct transmissions from a mobile terminal 22. Therefore, the cyber base station 128 may either report the same values the mobile terminal 22 reports for reception of the wireless home network signal since wireless home network links are generally balanced or the broadband modem may provide wireless home network measurement data to the cyber base station 128 via the voice client 102.

A specific process for accomplishing such handoffs is shown in FIG. 8. While a call is ongoing, a voice channel is established. Specifically, when operating in a cell 26 served by a radio base station 28, a voice channel (at 500) is between the mobile terminal 22 and the radio base station 28, and a voice channel (at 502) (using the T1 or E1 connections) is between the radio base station 28 and the mobile switching center 40. When the mobile terminal 22 roams into the wireless home network 100 (at 506), the mobile terminal 22 determines whether the wireless home network 100 meets the criteria for a handoff (e.g., an acceptable signal level and Bit Error Rate, using a hysteresis such as is known). The mobile terminal 22 reports (at 510) the measurement values to the radio base station 28, which relays those values (at 512) to the mobile switching center 40. The mobile switching center 40 may initiate the handoff because the cyber base station 128 is a preferred cell; if it does not, the mobile terminal 22 may report a strong signal and Bit Error Rate from the wireless home network 100 and a weak signal and Bit Error Rate from the current cellular traffic channel regardless of the actual measured values to force the mobile switching center 40 to execute a handoff.

Once the mobile switching center 40 receives a measurement report which supports a handoff from the cellular radio base station 28 to the wireless home network 100 and cyber base station 128 and therefore decides (at 514) to execute a handoff, it sends (at 516) a traffic channel allocation command instructing the cyber base station 128 to set up a traffic channel.

At this point, the cyber base station 128 and voice client 102 establish an internet traffic channel such as previously described. That is, the mobile switching center 40 sends (at 516) a traffic channel allocation to the cyber base station 128. Upon receiving the traffic channel allocation, the cyber base station 128 instructs (at 518) the voice client 102 to set up a connection for the traffic channel, and the voice client 102 creates the connection with the broadband internet protocol network 110 with the appropriate QoS and then sends (at 520) an acknowledgment which informs the cyber base station 128 that the connection has been created. The cyber base station 128 then sends (at 522) the traffic channel assignment on the internet channel assignment which the voice client 102 forwards (at 524) to the mobile terminal 22. When this has been accomplished, the cyber base station 128 sends (at 526) a traffic channel allocation acknowledgment to the mobile switching center 40 (telling the mobile switching center 40 that the mobile terminal 22 is now ready to operate on the wireless home network 100), and the mobile switching center 40 instructs (at 530) the radio base station 28 to handoff the current call on the traffic channel with the radio base station 28. The radio base station 28 accordingly instructs (at 532) the mobile terminal 22 to handoff.

In response to this instruction, the mobile terminal 22 moves (at 534) from the traffic channel with the radio base station 28 to an internet traffic channel on the wireless home network 100 and continues the current call on the voice channels (i.e., the voice channel at 540 on the wireless home network 100 between the mobile terminal 22 and the voice client 102, the voice channel at 542 on the internet traffic channel between the voice client 102 and the cyber base station 128, and the voice channel at 544 on the T1 or E1 connection between the cyber base station 128 and the mobile switching center 40). Since the mobile terminal 22 has a transmitter and receiver for both the normal cellular interface and the wireless home network 100 (e.g., Bluetooth) as previously described, the mobile terminal 22 may synchronize with the new internet traffic channel of the cyber base station 128 before leaving the traffic channel with the radio base station 28.

Once the mobile switching center 40 receives voice packets from the cyber base station 128 (indicating that the voice path to the mobile terminal 22 via the cyber base station 128 is operating), the mobile switching center 40 notifies (at 546) the radio base station 28 to drop the traffic channel which it had been using with the mobile terminal 22 and the handoff is completed. However, the radio base station 28 could also drop the traffic channel if the mobile terminal 22 acknowledges the handoff command.

(5) Mobile Terminal Handoff from a Wireless Home Network 100 to Cellular

As opposed to the above described situation (where a mobile terminal 22 while making a call moves into a wireless home network 100), a mobile terminal 22 will similarly at times when making a call move from a wireless home network 100 so that the wireless home network signal degrades, in which case the call should be continued using the normal cellular service. In such a case, a handoff from the wireless home network 100 to a radio base station 28 of the cellular system should be done.

Figure 9:
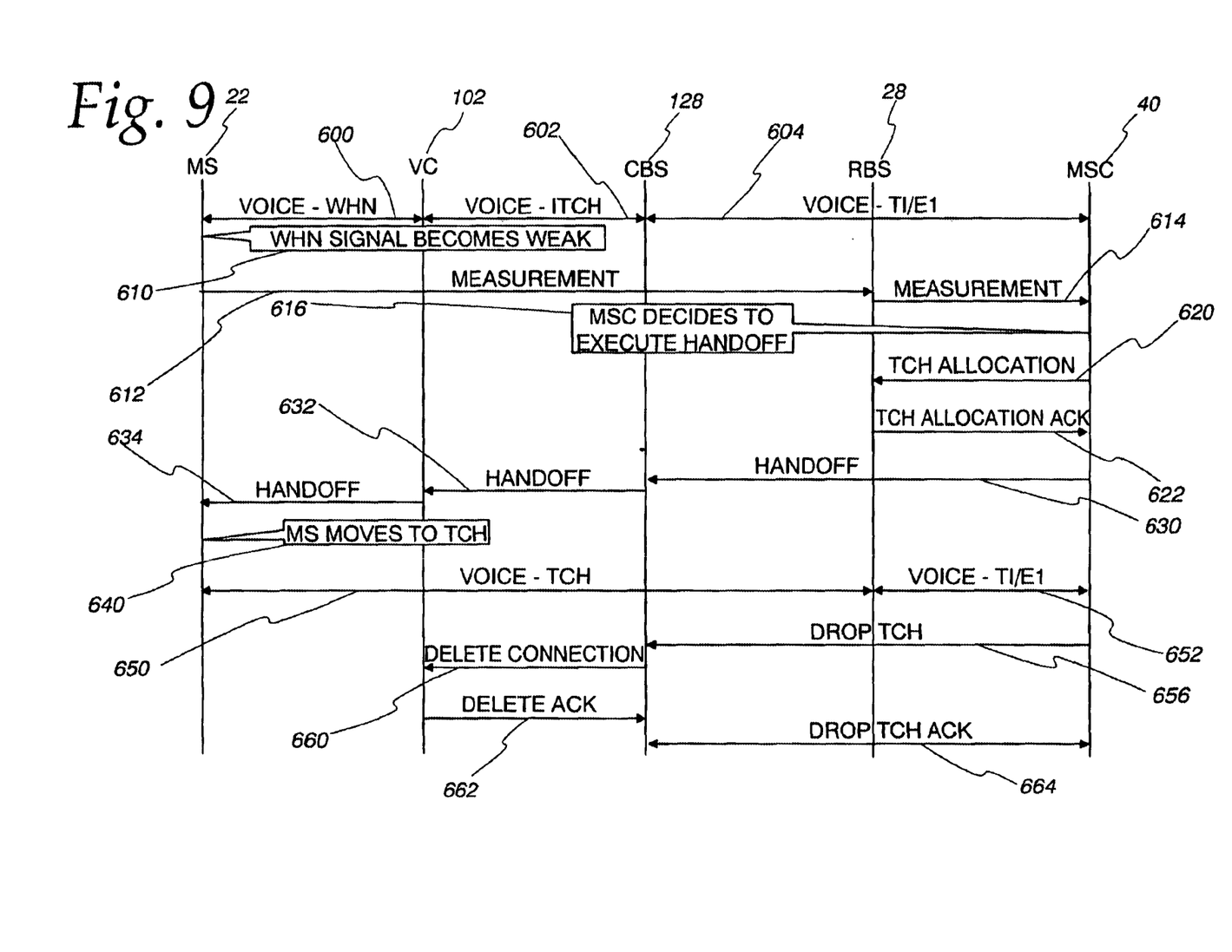
FIG. 9 is a flow chart of a handoff of a mobile terminal from the wireless local site network to cellular.

While making such a call, the mobile terminal 22 monitors the power level and Bit Error Rates of the current internet traffic channel and of the control channel of neighbor cells. This is similar to the situation in which a mobile terminal is in a cell on a traffic channel except that the mobile terminal 22 in this case should generate its own timing reference for measurements. For example, in TDMA based cellular systems, many mobile terminal functions are driven by the timing of frames on the traffic channel or control channel. This exact structure would not necessarily be replicated by the wireless home network 100, in which case the mobile terminal 22 could use internal timers to determine when to make measurements.

A specific process for accomplishing such handoffs is shown in FIG. 9. While a call is ongoing, a voice channel is established via the cyber base station 128. Specifically, like voice channels 330, 332, 334 in FIG. 6 and voice channels 440, 442, 444 in FIG. 7, a wireless voice channel (at 600) is between the mobile terminal 22 and the voice client 102, a voice channel (at 602) using the internet traffic channel is between the voice client 102 and the cyber base station 128, and a voice channel (at 604) using the T1 or E1 connections is between the cyber base station 128 and the mobile switching center 40. When the mobile terminal 22 roams away from the wireless home network 100 so that the signal becomes weak (at 610), the mobile terminal 22 reports (at 612) measurements of the signal (e.g., signal strength and Bit Error Rate). The mobile terminal 22 reports (at 612 and 614) the measurement values to the mobile switching center 40, which uses those values to determine whether to execute a handoff. If the mobile switching center 40 does not initiate the handoff, the mobile terminal 22 may report a weak signal and Bit Error Rate from the wireless home network 100 and a strong signal and Bit Error Rate from the current cellular traffic channel regardless of the actual measured values to force the mobile switching center 40 to execute a handoff.

Once the mobile switching center 40 receives a measurement report which supports a handoff from the wireless home network 100 to a cellular radio base station 28 in that location area and therefore decides (at 616) to execute a handoff, it sends (at 620) a traffic channel allocation command instructing that radio base station 28 to set up a traffic channel, and the radio base station 28 sends (at 622) an acknowledgment informing the mobile switching center 40 that the instruction has been received.

At this point, the mobile switching center 40 instructs (at 630) the cyber base station 128 to handoff the current call on the internet traffic channel, and this instructions is relayed (at 632) by the cyber base station 128 to the voice client 102, which itself relays (at 634) the instruction to the mobile terminal 22.

In response to this instruction, the mobile terminal 22 moves (at 640) from the internet traffic channel with the cyber base station 128 to the assigned traffic channel with the radio base station 28 and continues the current call on the voice channels (i.e., the voice channel at 650 between the mobile terminal 22 and the radio base station 28, and the voice channel at 652 between the radio base station 28 and the mobile switching center 40). Since the mobile terminal 22 has a transmitter and receiver for both the normal cellular interface and the wireless home network 100 as previously described, the mobile terminal 22 may synchronize with the new traffic channel of the radio base station 28 before leaving the internet traffic channel with the cyber base station 128.

Once the mobile switching center 40 receives voice packets from the radio base station 28 (indicating that the voice path to the mobile terminal 22 via the radio base station 28 is operating), the mobile switching center 40 notifies (at 656) the cyber base station 128 to drop the internet traffic channel which it had been using with voice client 102, and the cyber base station 128 sends (at 660) an instruction to the voice client 102 that the connection should be deleted. Receipt of that instruction is acknowledged (at 662) by the voice client 102 to the cyber base station 128, which in turn acknowledges (at 664) to the mobile switching center 40 that the internet traffic channel has been dropped, at which point the handoff is completed. However, the cyber base station 128 could also drop the internet traffic channel if the mobile terminal 22 acknowledges the handoff command.

It should now be understood from the disclosure herein that the present invention provides a method of expanding the capacity of cellular systems. Additional capacity for the cellular operator may be provided, which translates into additional revenue. Further, the present invention allows cellular operators to offload residential traffic from precious cellular traffic channels to the internet while leveraging the existing cellular infrastructure, including primary switching equipment and billing programs. Since such infrastructure is complicated and expensive, minimizing changes to the existing equipment and limiting the need for additional new equipment is a significant advantage not only in reducing the cost of equipment but also in allowing addition of the invention to current systems without undesirably impacting the current systems during change-over when adding the invention. The invention further leverages technologies that are becoming common place, including in homes, and can use equipment which the end user has or is planning to have in their location for other applications (thereby allowing the use of technologies which often are supplied for another purpose, and with a cost often borne by others than cellular operators). Still further, the end user can use the same cellular telephone in the home as well as on the road, which may allow some users to use their cellular telephone as their primary telephone (further increasing the revenue of cellular operators). Still further, since the mobile terminal 22 may radiate less energy when operating on a wireless home network 100 as opposed to normal cellular operation where communication is with a significantly more distant radio base station 28, the battery life of such mobile terminals 22 may be significantly improved. It should further be understood that the present invention may be used not only with voice communication, but with virtually any wireless communication technology including, inter alia, two-way text messaging, data transfers, and 3G (Third Generation) applications.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A local site communication system providing wireless communication with a mobile terminal in a local site and cooperating with a public communication system including a public service telephone network and a cellular communication network having a plurality of radio base stations covering a plurality of cells where switching of mobile terminal communication links with said public communication system is controlled by a mobile switching center, said local site communication system comprising:

a broadband connection between said local site and an internet wherein said local site is located in one of said plurality of cells covered by one of said plurality of radio base stations;

a wireless local site network in said local site for communicating data between said broadband connection and said mobile terminal when said mobile terminal is located in said local site; and a cyber base station connected to the internet and communicating data between said broadband connection and said mobile switching center whereby said mobile terminal when located at said local site connects to said public communication system via said wireless local site network, said broadband connection, the internet and said cyber base station, wherein said local site is located in one of said plurality of cells covered by one of said plurality of radio base stations, and wherein switching of said mobile terminal communication links of said cyber base station with said public communication system is controlled by said mobile switching center controlling switching of said mobile terminal communication links of said one of said plurality of radio base stations with said public communication system.

2. The local site communication system of claim 1, further comprising a voice client converting data between wireless signals on said wireless local site network and internet protocol signals on said broadband connection.

3. The local site communication system of claim 2, wherein said voice client adds internet protocol overhead to date received from said mobile terminal and to be sent from said wireless local site network to said cyber base station, and removes internet protocol overhead from data received from said cyber base station.

4. The local site communication system at claim 2, wherein said data communicated by said cyber base station includes a neighbor cell list for said local site communication system.

5. The local site communication system of claim 1, wherein said cyber base station communicates information on a control channel, and said control channel information includes internet protocol addresses.

6. The local site communication system of claim 1, wherein said cyber base station mimics a radio base station to said mobile switching center.

7. The local site communication system of claim 1, wherein said wireless local site network is a Bluetooth and said local site communication system communicates with a mobile terminal having cellular and Bluetooth communication interfaces.

8. The local site communication system of claim 1, wherein said local site communication system provides wireless communication
with mobile terminals in a plurality of local sites each having a broadband connection to the internet, and
a wireless local sits network communicating data between said broadband connection and a selected mobile terminal when said selected mobile terminal is located at said local site; and
said cyber base station communicates data between broadband connections and said mobile switching center.

9. The local site communication system of claim 8, wherein said cyber base station mimics a radio base station to said mobile switching center.

10. The local site communication system of claim 8, wherein said broadband connections are cables.

11. A wireless communication system, comprising:
a plurality of cells each served by a radio base station via wireless signals;
a plurality of low power wireless local site networks located in said plurality of cells, said wireless local site networks served by a cyber base station via an internet and each said wireless local site network including a low power transceiver for communicating with mobile terminals; and
a mobile switching center controlling said cyber base station and said radio base stations, wherein
said wireless local site networks are located in said plurality of cells covered by said radio base stations, and wherein switching of mobile terminal communication links of said cyber base station with a public communication system is accomplished by said mobile switching center controlling switching of said mobile terminal communication links of said radio base station with said public communication system.

12. The wireless communication system of claim 11, wherein said cyber base station communicates information on a control channel, and said control channel information includes internet protocol addresses.

13. The wireless communication system of claim 11, further comprising a voice client at each of said wireless local site networks, said voice clients converting data between wireless signals on said wireless local site network and internet protocol signals on the internet.

14. The wireless communication system of claim 13, wherein said voice client at each of said wireless local site networks adds internet protocol overhead to data received from said mobile terminal and to be sent from said wireless local site network to said cyber base station, and removes internet protocol overhead from data received from said cyber base station.

15. The wireless communication system of claim 11, wherein said cyber base station mimics said radio base stations to said mobile switching center.

16. The wireless communication system of claim 11, wherein said cells each having a list of neighboring cells, and said cyber base station is included in said list of neighboring cells for each of said cells within which said plurality of low power wireless local site networks is located.

17. The wireless communication system of claim 11, wherein each of said wireless local site network is a Bluetooth.

18. The wireless communication system of claim 11, further comprising broadband connections between said wireless local site networks and the internet.

19. The wireless communication system of claim 18, wherein said broadband connections are cables.

20. The wireless communication system of claim 11, wherein said mobile switching center controls said cyber base station like a pico base station.

21. A method of placing a call via a mobile switching center to a mobile terminal registered in a location area having a plurality of cells and a cybercell, comprising:
transmitting a page message from said mobile switching center to radio base stations in the location area end to a cyber base station serving said cybercell;
transmitting a wireless signal with said page message by said radio base stations;
transmitting an internet message with said page message by said cyber base station;
transmitting a low power wireless signal with said page message by a low power wireless local site network serving said cybercell;
responding from said mobile terminal to said base station serving said cell providing service to said the mobile terminal, where when said mobile terminal is being provided service by a wireless local site network serving a cybercell, said mobile terminal response is sent to said cyber base station as an internet protocol response message via said internet; and establishing a voice path from said mobile terminal to said mobile switching center via said wireless local site network, the internet and said cyber base station.

22. The method of claim 21, wherein said voice path carries data in internet protocol packets between said cyber base station and said wireless local site network.

23. The method of claim 22, wherein a voice client at said wireless local site network adds Internet protocol overhead to data received from said mobile terminal and to be sent from said wireless local site network to said cyber base station, and removes internet protocol overhead from data received from said cyber base station.

24. A method of placing a call to a phone via a mobile switching center from a mobile terminal served by a cybercell, comprising:

transmitting a call origination message from said mobile terminal to a wireless local site network serving said cybercell, wherein said wireless local site network is connected to an internet by a broadband connection;

transmitting an internet protocol message with said origination message from the wireless local site network via said broadband connection over the internet to an internet protocol address at a cyber base station providing an interface to said mobile switching center;

paging the called phone; and establishing a voice path from said mobile terminal to said mobile switching center via said wireless local site network, the internet and said cyber base station.

25. The method of claim 24, wherein said voice path carries data in internet protocol packets between said cyber base station end said wireless local site network.

26. The method of claim 25, wherein a voice client at said wireless local site network adds internet protocol overhead to data received from said mobile terminal and to be sent from said wireless local site network to said cyber base station, and removes internet protocol overhead from data received from said cyber base station.

* * * * *

UNITED STATES PATENT AND TRADEMARK OFFICE
CERTIFICATE OF CORRECTION

PATENT NO. : 6,947,405 B2  Page 1 of 1
APPLICATION NO. : 09/812210
DATED : September 20, 2005
INVENTOR(S) : Pitcher et al.

It is certified that error appears in the above-identified patent and that said Letters Patent is hereby corrected as shown below:

In Column 15, Line 23, in Claim 3, delete "date" and insert -- data --.

In Column 15, Line 48, in Claim 8, delete "sits" and insert -- site --, therefor.

In Column 16, Line 53, in Claim 21, delete "end" and insert -- and --, therefor.

In Column 16, Line 64, in Claim 21, after "said" delete "the".

In Column 18, Line 13, in Claim 25, delete "end" and insert -- and --, therefor.

Signed and Sealed this

Fifteenth Day of April, 2008

JON W. DUDAS
*Director of the United States Patent and Trademark Office*